US008726386B1

(12) United States Patent
McCorkendale et al.

(10) Patent No.: US 8,726,386 B1
(45) Date of Patent: May 13, 2014

(54) SYSTEMS AND METHODS FOR DETECTING MALWARE

(75) Inventors: Bruce McCorkendale, Manhattan Beach, CA (US); Xue Feng Tian, Beijing (CN); Sheng Gong, Beijing (CN); Xiaole Zhu, Beijing (CN); Jun Mao, Beijing (CN); Qingchun Meng, Beijing (CN); Guilin Hu, Beijing (CN); Ge Hua Huang, Beijing (CN)

(73) Assignee: Symantec Corporation, Mountain View, CA (US)

( * ) Notice: Subject to any disclaimer, the term of this patent is extended or adjusted under 35 U.S.C. 154(b) by 119 days.

(21) Appl. No.: 13/422,702

(22) Filed: Mar. 16, 2012

(51) Int. Cl.
*G06F 11/00* (2006.01)

(52) U.S. Cl.
USPC ............ 726/23; 726/25; 726/24; 726/22

(58) Field of Classification Search
CPC ........ C06F 21/56; C06F 21/564; C06F 21/00; C06F 21/554; C06F 21/57; C06F 21/53; C06F 21/563; C06F 21/565; H04L 63/145; H04L 63/1416; H04L 63/1433; H04L 63/123; H04L 63/1408; H04L 63/1441
See application file for complete search history.

(56) References Cited

U.S. PATENT DOCUMENTS

| 8,141,149 | B1 * | 3/2012 | Henry et al. .................... 726/22 |
| 2006/0070112 | A1 * | 3/2006 | LaMacchia et al. .............. 726/1 |
| 2008/0086640 | A1 * | 4/2008 | Voss et al. ..................... 713/171 |
| 2012/0255012 | A1 * | 10/2012 | Sallam ........................... 726/24 |
| 2013/0055401 | A1 * | 2/2013 | Kim et al. ....................... 726/25 |

* cited by examiner

*Primary Examiner* — Andrew Nalven
*Assistant Examiner* — Mohammed Waliullah
(74) *Attorney, Agent, or Firm* — ALG Intellectual Property, LLC

(57) ABSTRACT

A computer-implemented method for detecting malware may include 1) identifying an application configured to use a permission on a mobile computing platform, the permission enabling the application to access a feature of the mobile computing platform, 2) determining that the application is configured to use the permission while executing as a background application on the mobile computing platform, 3) determining that the use of the permission is suspect based on the application being configured to use the permission while executing as the background application, and 4) performing a remediation action in response to determining that the use of the permission is suspect. Various other methods, systems, and computer-readable media are also disclosed.

20 Claims, 6 Drawing Sheets

SYSTEMS AND METHODS FOR DETECTING MALWARE

BACKGROUND

With the rise of mobile computing, consumers may now access the Internet from anywhere. Mobile computing devices such as cellular telephones, tablet computers, e-book readers, and the like have become a ubiquitous part of everyday life. However, the ability to access the Internet from these devices also brings the various dangers of the Internet to these devices. Untrusted sources for mobile applications may offer malicious applications for download. Furthermore, trusted sources, such as digital distribution platforms (or "application stores") for some mobile platforms may sometimes inadvertently host malware. Additionally, malicious web pages may exploit vulnerabilities in web browser software that may allow malware to be downloaded to a user's mobile computing device.

Traditional anti-malware techniques may attempt to combat malware by searching application package files for specific strings and/or byte code sequences. However, these traditional techniques may be costly to perform on mobile platforms. Furthermore, these traditional techniques may be ineffective because malware authors may regularly modify their malware in an attempt to circumvent commonly employed static-string-based malware-detection mechanisms. Accordingly, the instant disclosure identifies a need for additional and improved systems and methods for detecting malware.

SUMMARY

As will be described in greater detail below, the instant disclosure generally relates to systems and methods for detecting malware by identifying applications that attempt to use mobile platform permissions without users' input and/or awareness. In one example, a computer-implemented method for detecting malware may include 1) identifying an application configured to use a permission on a mobile computing platform, the permission enabling the application to access a feature of the mobile computing platform, 2) determining that the application is configured to use the permission while executing as a background application on the mobile computing platform, 3) determining that the use of the permission is suspect based on the application being configured to use the permission while executing as the background application, and 4) performing a remediation action in response to determining that the use of the permission is suspect.

The permission may include any of a variety of permissions. For example, the permission may include 1) a permission to initiate a phone call, 2) a permission to send a text message, and/or 3) a permission to send a multimedia message.

In some examples, determining that the application is configured to use the permission while executing as the background application may include 1) identifying a use of the permission by the application within a function and 2) determining that the function is called in response to a non-user-initiated event.

In some embodiments, determining that the application is configured to use the permission while executing as the background application may include performing a static analysis of the application to predict a call path that indicates that the application uses the permission in a context originating while the application executes as the background application. In these embodiments, performing the remediation action may include marking the application as a suspect application and/or removing the application from an application store. Additionally or alternatively, determining that the application is configured to use the permission while executing as the background application may include performing a dynamic analysis of the application to identify a call path that indicates that the application uses the permission in a context originating while the application executes as the background application.

In one example, determining that the application is configured to use the permission while executing as the background application may include 1) intercepting an attempt to use the permission, 2) identifying a call stack leading to the attempt to use the permission, and 3) determining, based on the call stack, that the application originated the attempt while the application executed as the background application. In this example, the remediation action may include warning a user of the attempt to use the permission and/or blocking the attempt to use the permission.

In one embodiment, a system for implementing the above-described method may include 1) an identification module programmed to identify an application configured to use a permission on a mobile computing platform, the permission enabling the application to access a feature of the mobile computing platform, 2) a determination module programmed to determine that the application is configured to use the permission while executing as a background application on the mobile computing platform, 3) a suspicion module programmed to determine that the use of the permission is suspect based on the application being configured to use the permission while executing as the background application, and 4) a remediation module programmed to perform a remediation action in response to determining that the use of the permission is suspect. The system may also include at least one processor configured to execute the identification module, the determination module, the suspicion module, and the remediation module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify an application configured to use a permission on a mobile computing platform, the permission enabling the application to access a feature of the mobile computing platform, 2) determine that the application is configured to use the permission while executing as a background application on the mobile computing platform, 3) determine that the use of the permission is suspect based on the application being configured to use the permission while executing as the background application, and 4) perform a remediation action in response to determining that the use of the permission is suspect.

As will be explained in greater detail below, by identifying applications that attempt to use mobile platform permissions without users' input and/or awareness, the systems and methods described may potentially identify malware in mobile applications more effectively and/or efficiently.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
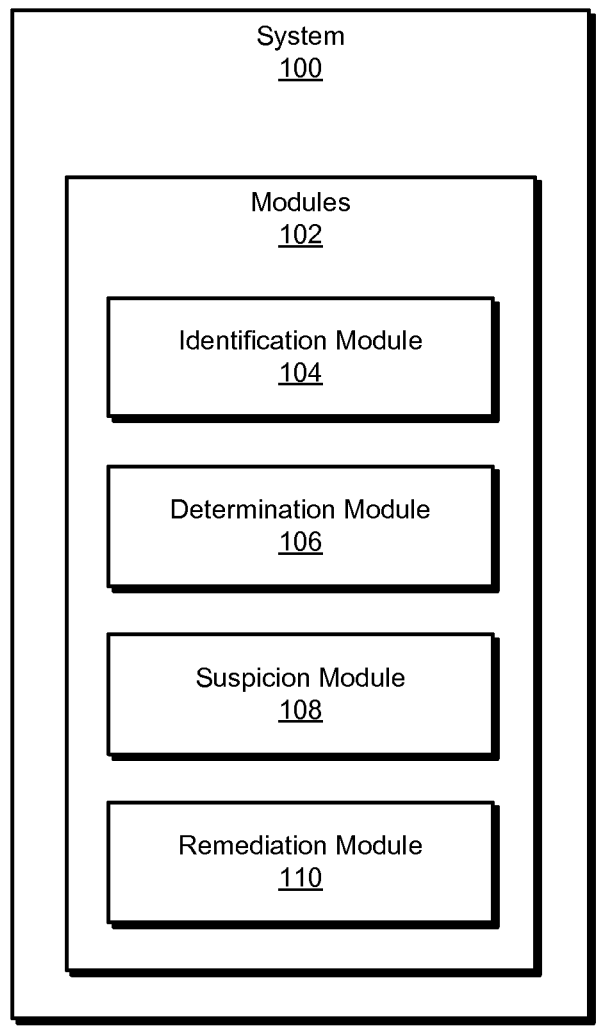
FIG. 1 is a block diagram of an exemplary system for detecting malware.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
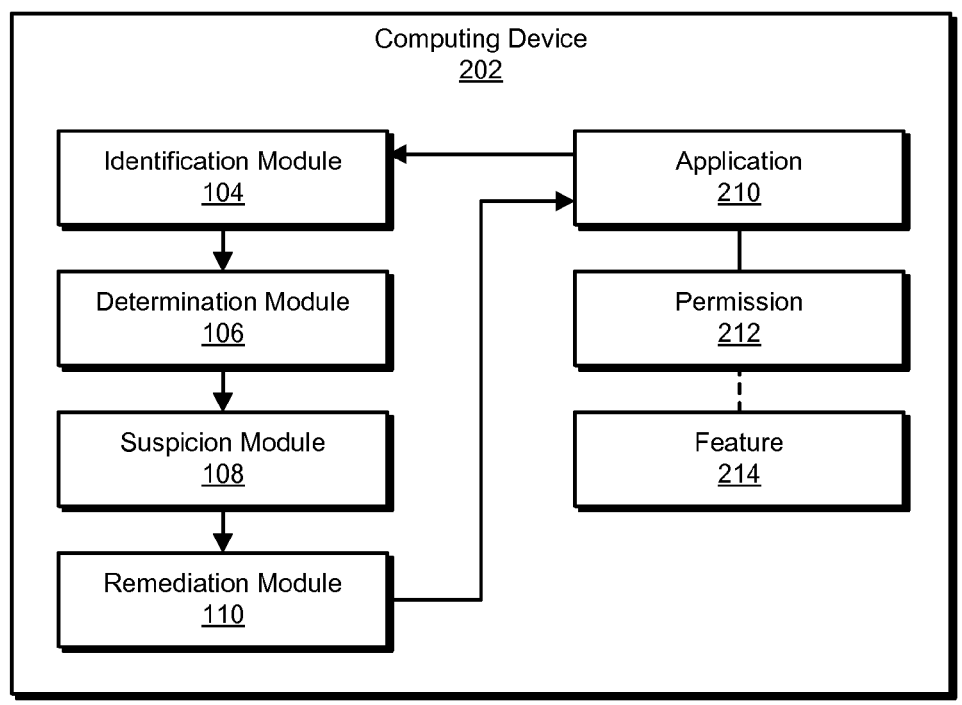
FIG. 2 is a block diagram of an exemplary system for detecting malware.

The following will provide, with reference to FIGS. 1-2, detailed descriptions of exemplary systems for detecting malware. Detailed descriptions of corresponding computer-implemented methods will also be provided in connection with FIG. 3. Detailed descriptions of exemplary call traces will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for detecting malware. As illustrated in this figure, exemplary system 100 may include one or more modules 102 for performing one or more tasks. For example, and as will be explained in greater detail below, exemplary system 100 may include an identification module 104 programmed to identify an application configured to use a permission on a mobile computing platform, the permission enabling the application to access a feature of the mobile computing platform. Exemplary system 100 may also include a determination module 106 programmed to determine that the application is configured to use the permission while executing as a background application on the mobile computing platform.

In addition, and as will be described in greater detail below, exemplary system 100 may include a suspicion module 108 programmed to determine that the use of the permission is suspect based on the application being configured to use the permission while executing as the background application. Exemplary system 100 may also include a remediation module 110 programmed to perform a remediation action in response to determining that the use of the permission is suspect. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 (e.g., a mobile computing device with a malicious application 210).

In one embodiment, one or more of modules 102 from FIG. 1 may, when executed by at least one processor of computing device 202, facilitate computing device 202 in detecting malware. For example, and as will be described in greater detail below, one or more of modules 102 may cause computing device 202 to 1) identify application 210 configured to use a permission 212 on a mobile computing platform (e.g., computing device 202), the permission enabling application 210 to access a feature 214 of the mobile computing platform, 2) determine that application 210 is configured to use permission 212 while executing as a background application on computing device 202, 3) determine that the use of permission 212 is suspect based on application 210 being configured to use permission 212 while executing as the background application, and 4) perform a remediation action (e.g., on application 210) in response to determining that the use of permission 212 is suspect.

Computing device 202 generally represents any type or form of computing device capable of reading computer-executable instructions. Examples of computing device 202 include, without limitation, cellular phones, tablets, e-book readers, personal digital assistants (PDAs), multimedia players, laptops, embedded systems, set-top boxes, desktops, servers, combinations of one or more of the same, exemplary computing system 510 in FIG. 5, or any other suitable computing device.

Figure 3:
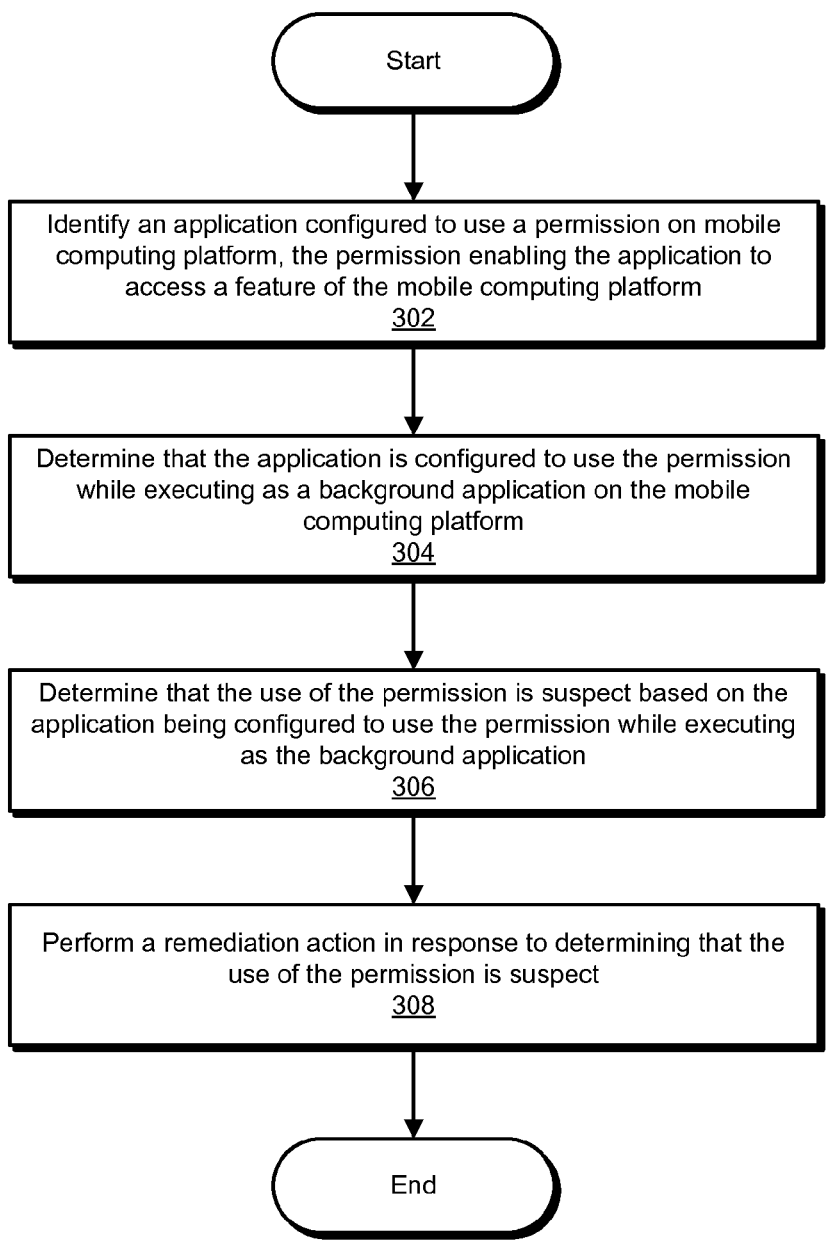
FIG. 3 is a flow diagram of an exemplary method for detecting malware.

FIG. 3 is a flow diagram of an exemplary computer-implemented method 300 for detecting malware. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify an application configured to use a permission on a mobile computing platform, the permission enabling the application to access a feature of the mobile computing platform. For example, at step 302 identification module 104 may, as part of computing device 202 in FIG. 2, identify application 210 configured to use a permission 212 on a mobile computing platform (e.g., computing device 202), the permission enabling application 210 to access a feature 214 of the mobile computing platform.

As used herein, the term "application" may refer to any application, program, module, script, daemon, and/or process that may execute on a mobile computing platform. As used herein, the phrase "mobile computing platform" may any computing device, software framework, and/or combination thereof. As previously noted, a mobile computing platform may include a mobile phone, a tablet computer, an e-book reader, a personal digital assistant, and the like. The phrase "mobile computing platform" may also generally refer to any other portable computing device with a user interface. Mobile computing platforms may include GPS devices, messaging devices, and various other types of mobile devices.

In some examples, the mobile computing platform may include a restricted platform that may interfere with some traditional methods for computing security. For example, the mobile computing platform may restrict modifications to system-level and/or base functionality. In some examples, the restricted mobile platform may limit the ability of third-party software to inspect the behavior of other applications, such as network traffic, file creation and/or modification, resource usage, and/or execution context. The restricted mobile platform may enforce these limitations as a part of the hardware of a mobile computing system and/or as a part of the operating system of the mobile computing device. In some examples, the restricted mobile platform may extend to an application store with exclusive privileges to allow certain configurations and/or software installations on the mobile computing system. In some examples, restrictions on the mobile platform may be enforced by decisions regarding whether to make an application available and/or visible in the application store. In some examples, restrictions on the mobile platform may hamper the use of third-party security software on the mobile platform by making use of the third-party security software difficult and/or costly, and/or by reducing features and/or the reliability of the mobile platform when third-party security software is installed.

In various examples, the mobile computing platform may include limited computing resources such that evaluating malware on the mobile computing platform may degrade the performance of the mobile computing platform. For example, the mobile computing platform may include limited processing power and/or limited volatile memory.

As mentioned above, in some examples the mobile computing platform may include a mobile computing device. Additionally or alternatively, the mobile computing platform may include an emulation and/or simulation of a mobile computing device. In some examples, and as will be explained in greater detail below, one or more of the systems and methods described herein may identify malicious applications by executing applications within an emulation and/or simulation of the mobile computing platform. Additionally or alternatively, the mobile computing platform may simply include a framework and/or a model describing existing and/or hypothetical mobile computing devices by which one or more of the systems described herein may analyze applications. Accordingly, in some examples the systems and methods described herein may analyze applications for malware without the use of either a mobile computing device or an emulation and/or simulation of a mobile computing device, but rather by using the mobile computing platform as a model for interpreting the application (e.g., in a call path analysis).

As used herein, the term "permission" may refer to any permission, privilege, designated access right, and/or authentication for accessing, using, manipulating, and/or viewing a computing resource and/or capability. In some examples, the permission may be granted by a user at the time of installation of the application. For example, the mobile computing platform may be configured to display one or more permissions required and/or used by the application and to receive verification that the user will grant the permissions to the application before installing and/or executing the application. In some examples, the mobile computing platform may divide a set of capabilities of the mobile computing system into a set of permissions to access the capabilities, and grant a subset of permissions to each installed application.

The permission may include any of a variety of permissions. For example, the permission may include a permission to initiate a phone call. Additionally or alternatively, the permission may include a permission to send a text message (e.g., a Short Messaging Service message, an Extended Messaging Service message, etc.). In one example, the permission may include a permission to send a multimedia message (e.g., a Multimedia Messaging Service message). In some examples, the permission may include a permission to perform an action that is expected (e.g., according to a predetermined categorization) to be a user-initiated permission. Additionally or alternatively, the permission may include a permission to perform an action that is expected (e.g., according to a predetermined categorization) to be performed by malware (e.g., by malware generally and/or by a particular family of malware).

Identification module 104 may identify the application in any of a variety of ways. In some examples, identification module 104 may identify the application within a repository of applications (e.g., to test for malware). Additionally or alternatively, identification module 104 may identify the application within an application store (e.g., identification module 104 may scan the application store for untested and/or untrusted applications). In some examples, identification module 104 may identify the application by receiving the application from a mobile computing device (e.g., for testing before installation). Additionally or alternatively, identification module 104 may identify the application on a mobile computing device by executing on the mobile computing device and determining that the application is installed and/or executing on the mobile computing device.

Returning to FIG. 3, at step 304 one or more of the systems described herein may determine that the application is configured to use the permission while executing as a background application on the mobile computing platform. For example, at step 304 determination module 106 may, as part of computing device 202 in FIG. 2, determine that application 210 is configured to use permission 212 while executing as a background application on computing device 202.

In some examples, the mobile computing platform may use a prioritization system and/or an interface system for running one or more foreground applications and one or more background applications. As used herein, the phrase "foreground application" may refer to any application that is currently displayed and/or currently prominently displayed on the mobile computing system. Additionally or alternatively, the phrase "foreground application" may refer to an application that is both currently displayed and currently executing. In some examples, the phrase "foreground application" may refer to an application that has the highest execution priority and/or highest display priority. In some examples, the phrase "foreground application" may exclude system services, system interface programs, and/or interface applications which temporarily overlay and/or share screen space with the current foreground application. In another example, the phrase "foreground application" may refer to any application currently displayed by the mobile computing system. Additionally or alternatively, the phrase "foreground application" may refer to an application whose display consumes more than half of the display area of the mobile computing device. Accordingly, the phrase "background application" may refer to any application that is executing but that is not executing as a foreground application according to any or all of the above-described characteristics that potentially apply to foreground applications.

Determination module 106 may determine that the application is configured to use the permission while executing as the background application in any of a variety of ways. For example, determination module 106 may 1) identify a use of the permission by the application within a function and 2) determine that the function is called in response to a non-user-initiated event.

As used herein, the term "event" may refer to any state configured to initiate an action and/or the initiated action. In some examples, the event may be observed, triggered, and/or initiated outside the scope of the application and then be processed by the application. For example, the application may include an event handler function executed in response to the event and/or may execute one or more instructions in response to an event notification. As used herein, the phrase "user-initiated event" may refer to any event that represents a user interaction and/or input. For example, a user-initiated event may include a click event. Accordingly, as used herein, the phrase "non-user-initiated event" may refer to an event that is not a user-initiated event. Additionally or alternatively, the phrase "non-user-initiated event" may refer to an automated event, an event not tied to an interface, an event that is transparent to a user, and/or an event that is handled by a background application. For example, a non-user-initiated event may include a timer event.

In some examples, determination module 106 may determine that the application is configured to use the permission while executing as the background application by performing a static analysis of the application to predict a call path that indicates that the application uses the permission in a context originating while the application executes as the background application. For example, determination module 106 may analyze one or more executable files (e.g., without executing the application) to identify a potential call path by which the application may use the permission without user direction and/or awareness.

In some examples, determination module 106 may determine that the application is configured to use the permission while executing as the background application by performing a dynamic analysis of the application to identify a call path that indicates that the application uses the permission in a context originating while the application executes as the background application. For example, determination module 106 may execute the application and/or one or more portions of the application under a variety of conditions and/or with a variety of inputs in order to identify the call path. Determination module 106 may use any suitable program testing and/or debugging techniques to identify a case in which the application uses the permission without user direction and/or awareness.

Determination module 106 may identify the call path in any suitable manner. For example, determination module 106 may identify a stack trace and/or generate a stack trace based on a call stack within a context of the application using the permission. For example, determination module 106 may intercept an attempt to use the permission. Determination module 106 may then identify a call stack leading to the attempt to use the permission. Determination module 106 may then determine, based on the call stack, that the application originated the attempt while the application executed as the background application (e.g., by following the call stack until identifying a call to a non-user-initiated event handler).

Figure 4:
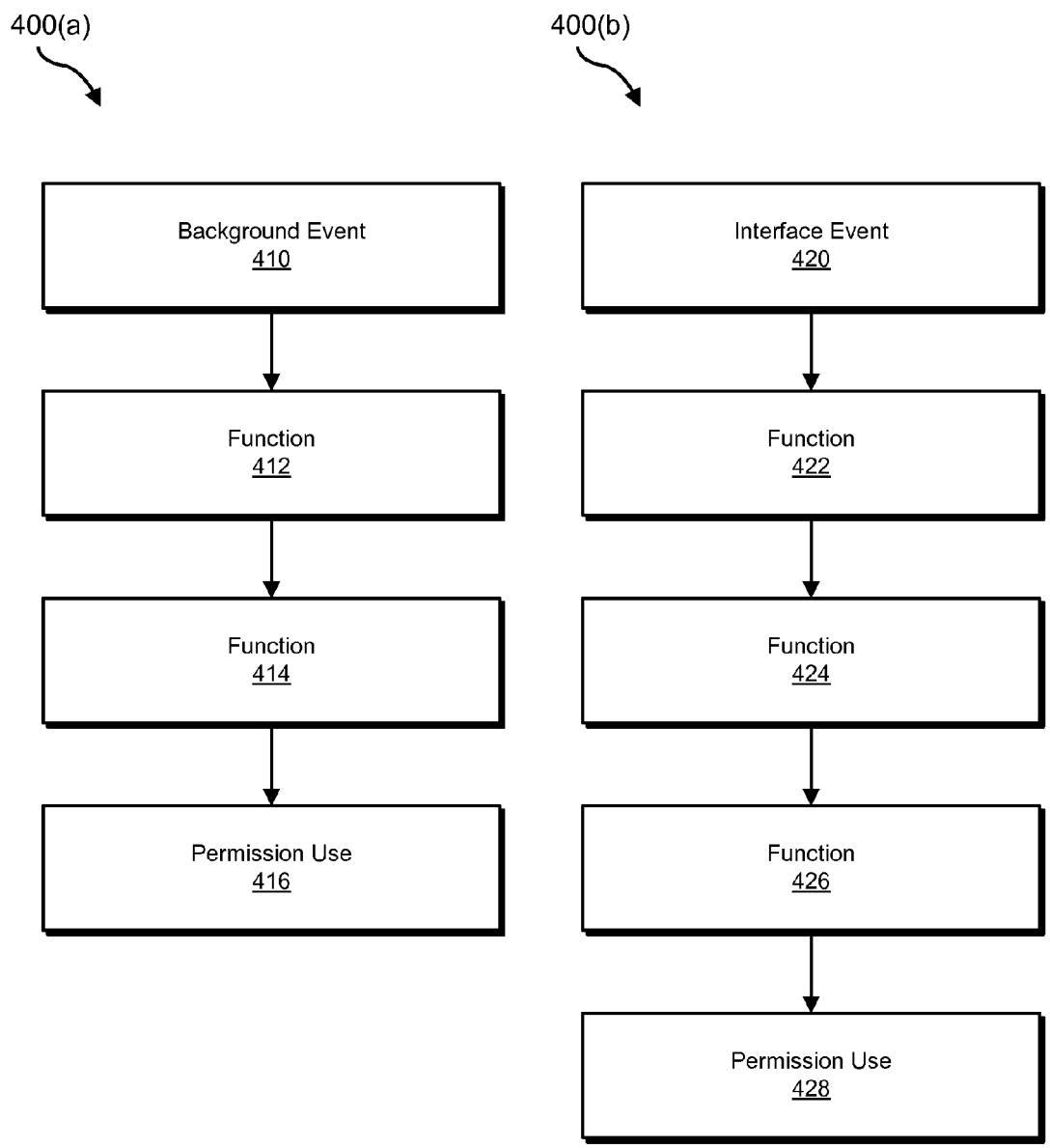
FIG. 4 is an illustration of exemplary call traces for detecting malware.

FIG. 4 illustrates exemplary call traces 400(a) and 400(b). As shown in FIG. 4, call trace 400(a) may show that a permission use 416 originates from a function 414, which, in turn, originates from a function 412, which, in turn, originates from a background event 410. Likewise, call trace 400(b) may show that a permission use 428 originates from a function 426, which, in turn, originates from a function 424, which, in turn, originates from a function 422, which, in turn, originates from an interface event 420. Accordingly, at step 304 determination module 106 may determine that permission use 416 originates from background event 410 (e.g., and therefore determine that permission use 416 is not user directed). Likewise, at step 304 determination module 106 may determine that permission use 428 originates from interface event 420 (e.g., and therefore determine that permission use 428 is user directed).

Returning to FIG. 3, at step 306 one or more of the systems described herein may determine that the use of the permission is suspect based on the application being configured to use the permission while executing as the background application. For example, at step 306 suspicion module 108 may, as part of computing device 202 in FIG. 2, determine that the use of permission 212 is suspect based on application 210 being configured to use permission 212 while executing as the background application.

Suspicion module 108 may determine that the application is suspect using any suitable combination of criteria. For example, suspicion module 108 may determine that the application is suspect solely based on the context of the use of the permission. Additionally or alternatively, suspicion module 108 may also use reputation data relating to the application (e.g., determine that the application is not on a whitelist of trusted applications), heuristic analysis (e.g., determine that one or more additional behaviors of the application are suspect), and/or any other suitable method for identifying illegitimate applications.

At step 308, in FIG. 3, one or more of the systems described herein may perform a remediation action in response to determining that the use of the permission is suspect. For example, at step 308 remediation module 110 may, as part of computing device 202 in FIG. 2, perform a remediation action (e.g., on application 210) in response to determining that the use of permission 212 is suspect.

The remediation action may include any action for stopping illegitimate behavior, reporting illegitimate behavior, and/or repairing illegitimate behavior. In some examples, remediation module 110 may direct the remediation action at the application. For example, remediation module 110 may mark the application as a suspect application. Additionally or alternatively, remediation module 110 may remove the application from an application store (e.g., a trusted repository for listing and/or providing applications). In some examples, remediation module 110 may report the behavior of the application to security vendor.

As mentioned earlier, in some examples one or more of the systems described herein may operate as a part of a mobile computing device to actively protect the mobile computing device. In these examples, remediation module 110 may warn a user of the attempt to use the permission. Additionally or alternatively, remediation module 110 may allow the user to determine whether to allow the use of the permission. In some examples, remediation module 110 may block the attempt to use the permission. Additionally or alternatively, remediation module 110 may terminate the application. Remediation module 110 also may remove the application from the mobile computing device. In some examples, remediation module 110 may revoke the permission from the application.

As explained above, by identifying applications that attempt to use mobile platform permissions without users' input and/or awareness, the systems and methods described may potentially identify malware in mobile applications more effectively and/or efficiently.

Figure 5:
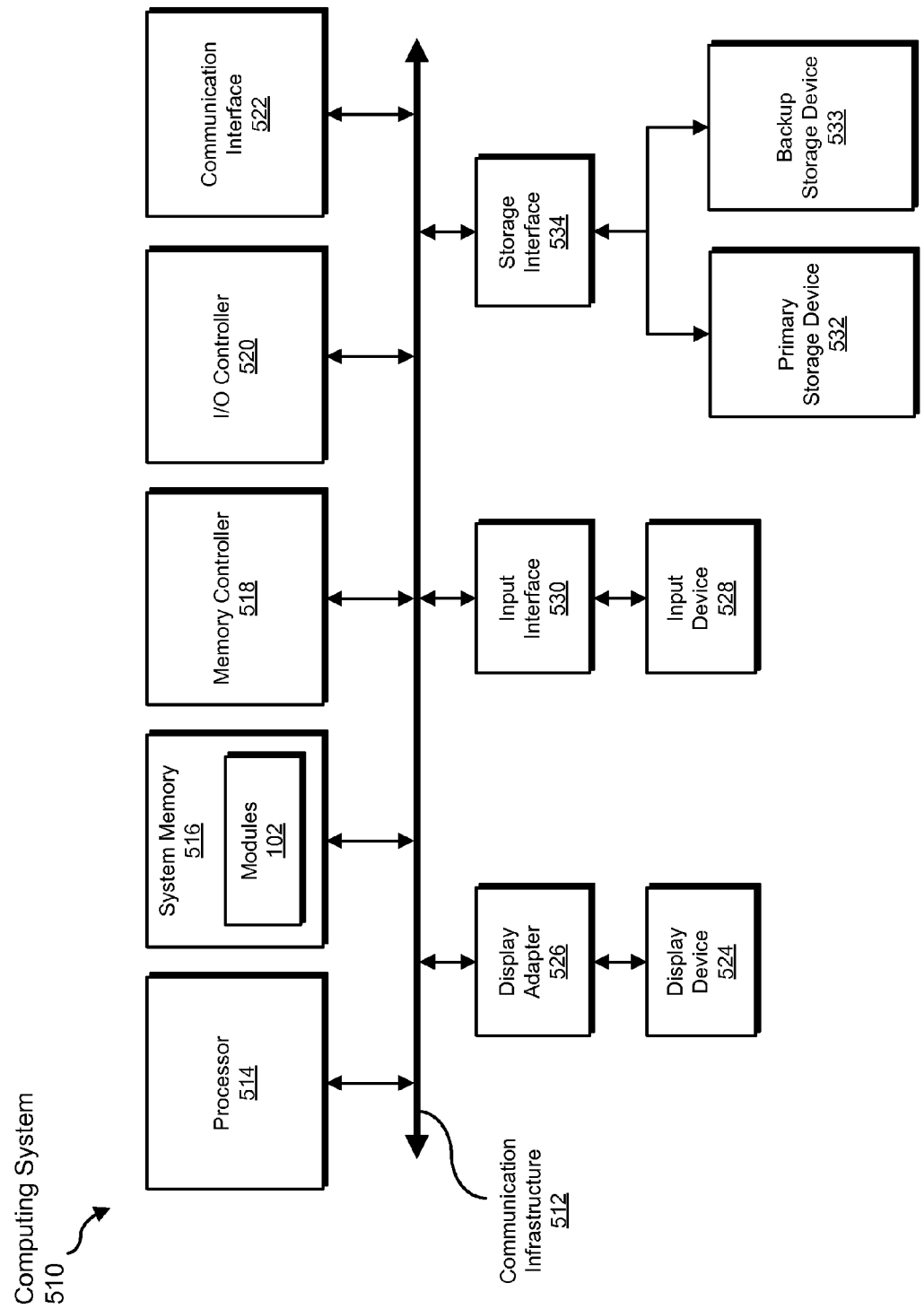
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, determining, performing, intercepting, marking, removing, warning and blocking steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
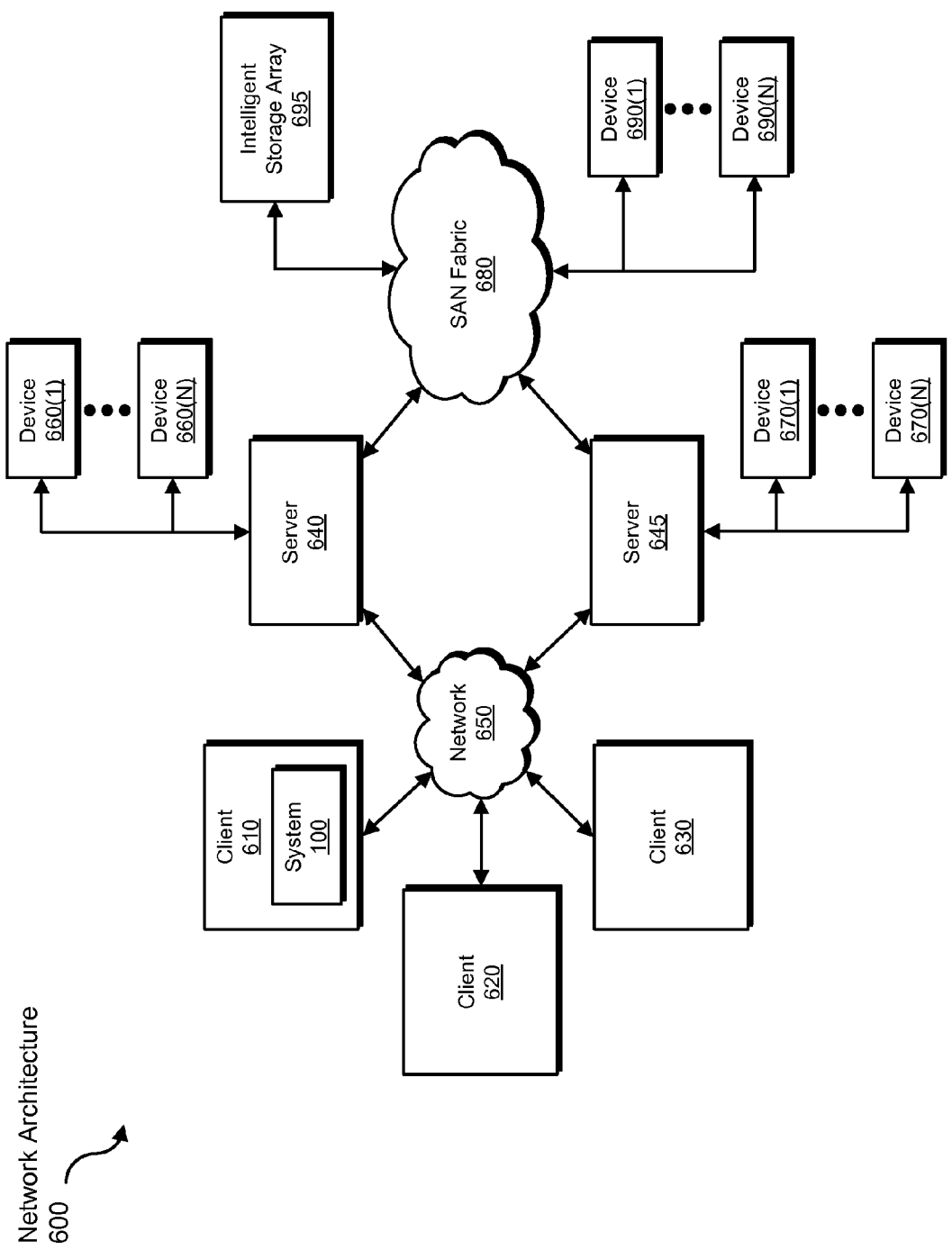
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, determining, performing, intercepting, marking, removing, warning and blocking steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for detecting malware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing device into a device for detecting malware. As another example, one or more of the modules recited herein may transform a computing device into a device free of malware.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for detecting malware, at least a portion of the method being performed by a computing device comprising at least one processor, the method comprising:
identifying an application configured to use a permission on a mobile computing platform, the permission enabling the application to access a feature of the mobile computing platform;
determining that the application is configured to use the permission while executing as a background application on the mobile computing platform by performing at least one of a static analysis or a dynamic analysis of the application to predict a call path that indicates that the application uses the permission in a context originating while the application executes as the background application;
determining that the use of the permission is suspect based on the application being configured to use the permission while executing as the background application;
performing a remediation action in response to determining that the use of the permission is suspect.

2. The computer-implemented method of claim 1, wherein determining that the application is configured to use the permission while executing as the background application comprises:
identifying a use of the permission by the application within a function;
determining that the function is called in response to a non-user-initiated event.

3. The computer-implemented method of claim 1, wherein performing the static analysis of the application comprises analyzing at least one executable file while the application is not executing.

4. The computer-implemented method of claim 1, wherein performing the remediation action comprises at least one of:
marking the application as a suspect application;
removing the application from an application store.

5. The computer-implemented method of claim 1, wherein performing the dynamic analysis of the application comprises executing at least a portion of the application.

6. The computer-implemented method of claim 1, wherein determining that the application is configured to use the permission while executing as the background application comprises:
intercepting an attempt to use the permission;
identifying a call stack leading to the attempt to use the permission;
determining, based on the call stack, that the application originated the attempt while the application executes as the background application.

7. The computer-implemented method of claim 6, wherein performing the remediation action comprises at least one of:
warning a user of the attempt to use the permission;
blocking the attempt to use the permission.

8. The computer-implemented method of claim 1, wherein the permission comprises at least one of:
a permission to initiate a phone call;

a permission to send a text message;

a permission to send a multimedia message.

9. A system for detecting malware, the system comprising:
- an identification module programmed to identify an application configured to use a permission on a mobile computing platform, the permission enabling the application to access a feature of the mobile computing platform;
- a determination module programmed to determine that the application is configured to use the permission while executing as a background application on the mobile computing platform by performing at least one of a static analysis or a dynamic analysis of the application to predict a call patch that indicates that the application uses the permission in a context originating while the application executes as the background application;
- a suspicion module programmed to determine that the use of the permission is suspect based on the application being configured to use the permission while executing as the background application;
- a remediation module programmed to perform a remediation action in response to determining that the use of the permission is suspect;
- at least one processor configured to execute the identification module, the determination module, the suspicion module, and the remediation module.

10. The system of claim 9, wherein the determination module is programmed to determine that the application is configured to use the permission while executing as the background application by:
- identifying a use of the permission by the application within a function;
- determining that the function is called in response to a non-user-initiated event.

11. The system of claim 9, wherein the determination module is programmed to perform the static analysis of the application by analyzing at least one executable file while the application is not executing.

12. The system of claim 9, wherein the remediation module is programmed to perform the remediation action by at least one of:
- marking the application as a suspect application;
- removing the application from an application store.

13. The system of claim 9, wherein the determination module is programmed to perform the dynamic analysis of the application by executing at least a portion of the application.

14. The system of claim 9, wherein the determination module is programmed to determine that the application is configured to use the permission while executing as the background application by:
- intercepting an attempt to use the permission;
- identifying a call stack leading to the attempt to use the permission;
- determining, based on the call stack, that the application originated the attempt while the application executes as the background application.

15. The system of claim 14, wherein the remediation module is programmed to perform the remediation action by at least one of:
- warning a user of the attempt to use the permission;
- blocking the attempt to use the permission.

16. The system of claim 9, wherein the permission comprises at least one of:
- a permission to initiate a phone call;
- a permission to send a text message;
- a permission to send a multimedia message.

17. A non-transitory computer-readable-storage medium comprising one or more computer-executable instructions that, when executed by at least one processor of a computing device, cause the computing device to:
- identify an application configured to use a permission on a mobile computing platform, the permission enabling the application to access a feature of the mobile computing platform;
- determine that the application is configured to use the permission while executing as a background application on the mobile computing platform by performing at least one of a static analysis or a dynamic analysis of the application to predict a call path that indicates that the application uses the permission in a context originating while the application executes as the background application;
- determine that the use of the permission is suspect based on the application being configured to use the permission while executing as the background application;
- perform a remediation action in response to determining that the use of the permission is suspect.

18. The computer-readable-storage medium of claim 17, wherein the one or more computer-executable instructions cause the computing device to determine that the application is configured to use the permission while executing as the background application by causing the computing device to:
- identify a use of the permission by the application within a function;
- determine that the function is called in response to a non-user-initiated event.

19. The computer-readable-storage medium of claim 17, wherein the one or more computer-executable instructions cause the computing device to perform the static analysis of the application by analyzing at least one executable file while the application is not executing.

20. The computer-readable-storage medium of claim 17, wherein the one or more computer-executable instructions cause the computing device to perform the remediation action by causing the computing device to at least one of:
- mark the application as a suspect application;
- remove the application from an application store.

* * * * *